United States Patent [19]

Reiman et al.

[11] Patent Number: 4,668,464
[45] Date of Patent: May 26, 1987

[54] METHOD AND APPARATUS FOR MAINTAINING EQUILIBRIUM IN A HELICAL AXIS STELLARATOR

[75] Inventors: Allan Reiman, Princeton; Allen Boozer, Rocky Hill, both of N.J.

[73] Assignee: The United States of America as represented by the United States Department of Energy, Washington, D.C.

[21] Appl. No.: 666,585

[22] Filed: Oct. 31, 1984

[51] Int. Cl.$^4$ .............................................. G21B 1/00
[52] U.S. Cl. .................................... 376/133; 376/121
[58] Field of Search ................ 376/121, 133, 142, 149

[56] References Cited

U.S. PATENT DOCUMENTS 2,991,238  7/1961  Phillips et al. ...................... 376/133

OTHER PUBLICATIONS

Talmadge et al., "MHO Equilibria of a Non-Circular Cross-Section Stellerator", Nuclear Fusion, 1977, pp. 1023-1030.
Johnson, "The Stellerator Approach to Toroidal Plasma Confinement", Nuclear Tech./Fusion, vol. 2, pp. 340-361, Jul. 1982.
Anania et al., "App. of the Stellerator Exp. for Plasma Stability Studies in Steklerators", PPPL-1996, Apr. 1983.
Reiman et al., "Island Formation & Destruction of Flux Surfaces in 3-D MHO Equilibria", PPPL-2062, Nov. 1983.

Primary Examiner—Deborah L. Kyle
Assistant Examiner—Richard L. Klein
Attorney, Agent, or Firm—Jeannette M. Walder; Gustavo Siller, Jr.; Judson R. Hightower

[57] ABSTRACT

Apparatus for maintaining three-dimensional MHD equilibrium in a plasma contained in a helical axis stellerator includes a resonant coil system, having a configuration such that current therethrough generates a magnetic field cancelling the resonant magnetic field produced by currents driven by the plasma pressure on any given flux surface resonating with the rotational transform of another flux surface in the plasma. Current through the resonant coil system is adjusted as a function of plasma beta.

7 Claims, 1 Drawing Figure

METHOD AND APPARATUS FOR MAINTAINING EQUILIBRIUM IN A HELICAL AXIS STELLARATOR

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

In the design of stellarators as plasma confinement devices and candidates for fusion reactors, simplifying assumptions concerning basic MHD equilibrium have been made. In previous analyses of helical axis stellarators, the assumption has been made that for large aspect ratio, the stellarator could be approximated by an infinite cylinder. This assumption reduced the MHD equilibrium equations to two-dimensions, thus affording simplified solutions. However, during experiments on such stellarators, plasma confinement was lost at high plasma pressure, contrary to theoretical predictions based on two-dimensional equilibrium solutions.

The inventors have recently determined that in a three-dimensional MHD equilibrium, the diamagnetic and Pfirsch-Schlüter currents driven by the pressure on any given flux surface may resonate with the rotational transform of a flux surface elsewhere in the plasma. This results in the appearance of magnetic islands and the destruction of flux surfaces in the equilibrium. These resonant equilibrium currents are unique to three-dimensional equilibria and are precluded by symmetry in one or two dimensions. In one- or two-dimensional equilibria islands may be generated by the appearance of a (symmetry breaking) tearing instability. However, the islands driven by resonant diamagnetic and Pfirsch-Schlüter currents are intrinsic to the equilibrium. When these islands are sufficiently large that they overlap, the flux surfaces are destroyed, and there is no equilibrium.

Therefore, it is an object of the present invention to provide a method and apparatus for maintaining three-dimensional MHD equilibrium in helical axis stellarators.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention, a method of maintaining three-dimensional MHD equilibrium in a plasma contained in a helical axis stellarator may comprise the steps of: providing a current through a resonant coil system about said stellarator, said coil having a configuration such that said current therethrough generates a magnetic field cancelling the resonant magnetic field, $B_1$, produced by currents driven by the plasma pressure at any given flux surface resonating with the rotational transform, $\chi$, of another flux surface in the plasma; and varying said current as a function of $\beta$, where $\beta = 2p_o/B_o^2$, $p_o$ is the average plasma pressure, and $B_o$ is the average stellarator magnetic field. Apparatus for maintaining three-dimensional MHD equilibrium in a plasma contained in a helical axis stellarator may comprise: a resonant coil system about said stellarator, said coil having a configuration such that current therethrough generates a magnetic field cancelling the resonant magnetic field, $B_1$, produced by currents driven by the plasma pressure on any given flux surface resonating with the rotational transform, $\chi$, of another flux surface in the plasma. Suitable resonant coil systems may include helical coils wound about the stellarator and modular coils. For the case of resonant helical coils $\chi = n/m$, where m is the number of periods of the coil, and n is the number of turns of the coil carrying the current in the same direction. Expressions for the resonant magnetic field are developed in the following section.

DETAILED DESCRIPTION OF THE INVENTION

The MHD equilibrium equation, $$\nabla p = j \times B,$$

also describes steady flow in an incompressible, inviscid, neutral fluid if $B \to v$ and $p + B^2/2 \to -p^*$, where $p^*$ is the pressure of the neutral fluid. This equivalence is clear if the MHD equilibrium equation is rewritten in the form $$\nabla(p + B^2/2) = B \cdot \nabla B.$$

The MHD equilibrium $\beta$ limit corresponds to a condition for the onset of stochastic, steady flow.

The resonant pressure driven currents in an MHD equilibrium are associated with the variation of $\int dl/B$ on the corresponding rational surface, where the integral is taken around a closed field line. There is a distinction between direct resonances, due to the variation of $\int dl/B$ in the vacuum field, and nonlinear resonances, due to a variation of $\int dl/B$ that arises in the presence of finite $\beta$. The amplitude of the direct resonances can be minimized by proper design of the stellarator. The nonlinear resonances, on the other hand, are intrinsic to the three-dimensional nature of the equilibrium, and give a fundamental $\beta$ limit for each type of stellarator. Even if $\int dl/B$ is constant on every rational surface in the vacuum field, it is generally not constant on any rational surface in the presence of finite $\beta$.

Adding a pressure $p(\psi)$ to a given vacuum field $B$, where $\psi$ is constant on the vacuum flux surfaces, the diamagnetic current at low $\beta$ is approximately given by $$j_\perp = (1/B^2) B \times \nabla p. \qquad (1)$$

The corresponding Pfirsch-Schlüter current is determined by $\nabla \cdot j = 0$, or $$B \cdot \nabla(j_\parallel/B) = -\nabla \cdot j_\perp. \qquad (2)$$

The total field is approximately given by the vacuum field, $B$ plus the field driven by these plasma currents, which we call $B_1$. If $\beta$ is sufficiently small, the finite $\beta$ shifts of the flux surfaces are determined by $B_1$. We can iterate the above procedure, calculating the diamagnetic and Pfirsch-Schlüter currents from $B + B_1$. At low $\beta$ the corrections to the currents are small.

The pressure driven currents are conveniently determined in a set of vacuum flux coordinates $(\psi, \theta, \phi)$ such that $$B = g \nabla \phi, \qquad (3)$$

where $cg/2$ is the total poloidal current in the coils. The Jacobian is then $$J = g/B^2. \tag{4}$$

The currents are obtained in terms of the Fourier decomposition of the Jacobian, $$J = J_0 \left[ 1 + \underset{n,m}{\Sigma'} \delta_{nm} \cos(n\phi - m\theta) \right], \tag{5}$$

where the prime indicates that the term $n=0$, $m=0$ is omitted from the sum. In neglecting the sin $(n\phi-m\theta)$ terms in Eq (5) we have assumed for convenience a symmetry with respect to double reflection in an appropriately chosen poloidal and equatorial plane. Most stellarator designs have this symmetry.

Because all of results are expressed in terms of the $\delta_{nm}$, it is important to note that for any given vacuum field the $\delta_{nm}$ can be determined numerically in a straightforward manner by an integration along the field lines.

In solving Eqs. (1) and (2) for the lowest order currents, we take the equilibrium to have zero net current within each flux surface, as is appropriate for stellarators. For $p(\psi)$ given, the solution of these equations is then $$\underline{j} = J \frac{dp}{d\psi} \left[ \nabla\phi \times \nabla\psi + \underset{n,m}{\Sigma'} \frac{\delta_{nm}}{n - \chi m} \cos(n\phi - m\theta)\nabla\psi \times (m\nabla\theta - n\nabla\phi) \right]. \tag{6}$$

The resonant currents give rise to a resonant part of $\underline{B}\cdot\nabla\psi$, which opens up an island at such a rational surface, so that the resonant current vanishes as we approach the rational surface itself. The island width increased as $\sqrt{\beta}$. The importance of such islands can be minimized by properly designing the vacuum field to minimize $\delta_{nm}$ for those n,m corresponding to a rational surface, $\chi=n/m$.

The resonant terms in Eq. (6) give rise to resonant components of $B_1\cdot\nabla\psi$, which produce magnetic islands. In calculating the island width, we take the net toroidal current to be zero also inside the flux surfaces defined by the islands. During the initial formation of the islands, currents are induced in the islands which retard their growth. These localized currents are rapidly damped. Since we are interested in Ohmic stellarator equilibria, for which the net toroidal current inside each flux surface is zero, we clearly must take the island currents to be zero.

For a stellarator with nearly circular flux surfaces, the island half-width, $w$, at $\chi=n/m$ is $$w \approx \left| \frac{2L\, B_1\, \rho nm}{\pi B_0\, m\, d\chi/d\rho} \right|^{\frac{1}{2}}, \tag{7}$$

where $L$ is the length of the magnetic axis, $B_0$ is the field on the axis, $\rho$ is the distance from the magnetic axis.

We find that the resonant radial component of $B_1$ at the rational surface with $\chi=n/m$ is $$\frac{B_{1\rho}}{B_0} \approx \tag{8}$$

$$\beta_0 \frac{L}{4\pi a^2} \delta_{nm} \left[ \ln\frac{a - \rho_0}{\rho_0} + \sum_{j=1}^{2m+1} \frac{1}{j} + \frac{a}{\rho_0} \right] \sin(n\phi - m\theta),$$

where $$\beta_0 \equiv 2p_o/B_o^2.$$

Note that although the $\ln(a-\rho_o)$ term blows up if we evaluate Eq. (8) for rational surfaces closer and closer to the plasma edge, the singularity is cancelled by the $\ln(m)$ dependence of the following term. The field itself is well-behaved. Equations (7) and (8) together determine the island widths due to the direct resonances.

All of the results obtained have been expressed in terms of the Fourier amplitudes of the Jacobian, the $\delta_{nm}$. To understand these results, it is necessary to understand the physical significance of the $\delta_{nm}$. The toroidal curvature of the stellarator gives the Jacobian a cos $\theta$ dependence, and thus contributes to the nonresonant $\delta_{01}$ term in Eq. (5). The resulting plasma field gives a toroidal shift of the flux surfaces. This is the well-known toroidal Shafranov shifts, which exists even in an axisymmetric device such as the tokamak. In a helical axis stellarator, the helical curvature gives J a cos $(\theta - N\phi)$ dependence, contributing to the (the non-resonant) $\delta_{N1}$. The resulting field gives a helical flux surface shift. The shape of the flux surfaces is determined by the $m\geq 2$ contributions to $\delta_{nm}$. In stellarator vacuum field designs, the resonant harmonic content of the flux surface shapes is kept small by the requirement that no large islands be present in the vacuum field. This condition is not sufficient to preclude the presence of sizable resonant $\delta_{nm}$'s. However, these resonant terms are not intrinsic to the stellarator design, so we expect that they can be suppressed. The amplitudes of the $\delta_{nm}$ for the vacuum field decay exponentially with increasing m and n, so that at most a few such resonant terms need to be suppressed.

DESCRIPTION OF THE DRAWING

The present invention is illustrated in the accompanying drawing showing a schematic of helical axis stellarator 10 with the stellarator primary coil 40 a resonant helical coil 20 wound about it and means 30 for varying the current through the resonant coil 20.

EXAMPLE

Figure 1:
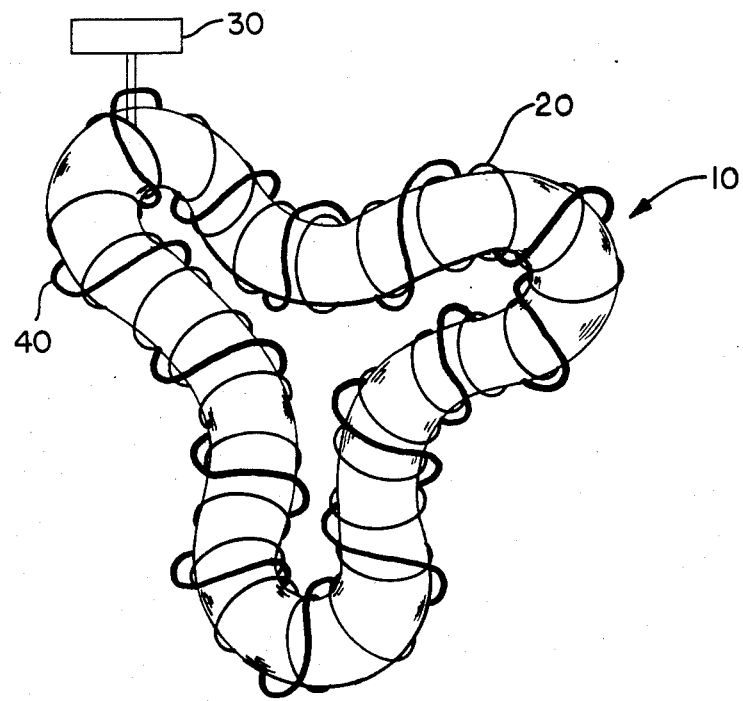

The above has been applied to a three-period, helical axis stellarator. This stellarator has a relatively large rotational transform which implies a relative small finite $\beta$ magnetic axis shift. The value of $\chi$ increases from slightly above 1.5 at the magnetic axis to about 1.7 at the edge. The axis shifts halfway to the outer flux surface at a $\beta$ of about 15%.

The $\delta_{nm}{}^v$ for a general vacuum field should decrease rapidly in amplitude as n or m increases. This is borne out for this heliac by a numerical Fourier decomposition of the vacuum field. The largest components correspond to $(n,m)=(3,0)$, $(0,1)$, and $(3,1)$. Of course, n must be a multiple of 3 because of the periodicity. The $\delta_{30}$ component corresponds to the field ripple on the magnetic axis. It is very nearly equal to $2r_o/R=0.5$, where $r_o$ is the radius of the helix formed by the magnetic axis and R is the major radius. The $\delta_{01}$ term, which is due to the toroidal curvature, is about $2.5\rho/R$, where $\rho$ is taken to be the circularized flux surface radius. The helical curvature gives the $_{31}$ term, which has a value of about $\delta_{31} = 1.3\rho/r_{ch}$, where $r_{ch}$ is the helical radius of curvature of the magnetic axis, $r_{ch} = (1 + k^2 r_o^2)/(k^2 r_o 0)$, ($2\pi/k$ is the periodicity length).

The decrease of $\delta_{nm}{}^\nu$ with increasing (n,m) implies that the most dangerous direct resonances are those with low n and m. Higher order resonances are due to coupling of the $\delta_{nm}{}^\nu$. The coupling is strongest for resonance with low n and m. So here again the low order resonances are the most dangerous. For this heliac, the most serious problem is posed by the n=3, m=2 resonance, which lies at the magnetic axis. (The transform at the axis is actually very slightly above 1.5. It is convenient for the following discussion to take $\chi$ there as 1.5 exactly, which has only a small effect on the results.) The radial m=2 component of the plasma field goes to zero at the axis; but $d\chi/d\rho$ also vanishes there, so that the island width can nonetheless be finite. It is necessary to modify Eqs. (7) and (8) to take into account the vanishing $d\chi/d\rho$.

Specializing to n=3, m=2, we estimate $$n - m\chi - 2\frac{d\chi}{d\chi}\Delta\chi \approx -2\Delta\chi\rho^2/a^2, \quad (9)$$

where $\Delta\chi$ is the change in $\chi$ across the minor radius, a. We obtain $$\frac{B_{1\rho}}{B_0} \simeq \beta_0 \frac{L}{4\pi\Delta\chi} \frac{\delta_{32}}{\rho}\left(\ln\frac{a}{\rho} + \frac{1}{4}\right) \sin(3\phi - 2\theta). \quad (10)$$

This is the required modification of Eq. (8).

The $\delta_{31}{}^\nu$ and $\delta_{01}{}^\nu$ components couple directly to give a nonlinear $\delta_{32}$ component. The corresponding island width is equal to half the minor radius at $\beta_o \simeq 0.017$. The $\delta_{31}{}^\nu$ and $\delta_{01}{}^\nu$ Fourier components are intrinsic to the heliac vacuum field, and can be eliminated by the use of a helical equilibrium coil whose current is adjusted as a function of $\beta$ to suppress the resonant n=3, m=2 part of the equilibrium field. A few helical equilibrium coils would suffice to suppress the islands at the low order rational surfaces.

In the general design of stellarator vacuum fields, we might have expected the requirement of good vacuum flux surfaces to suppress the resonant field amplitudes. Our calculation for the heliac reference design shows that the amplitudes of the direct resonances may nonetheless be unacceptably large. We conclude that it is necessary to incorporate the constraints on the resonant $\delta_{nm}{}^\nu$ directly in the design procedures. Our application also shows that coupling of nonresonant components can give large islands, even for values of $\beta$ at which the axis shift is small relative to the minor radius.

In summary, we have proposed the use of resonant coil systems, such as helical coils, carrying relatively small currents. The required current in the coils is determined by the plasma pressure, as given by equations (8) and (10). Initially the current is zero, to avoid the deleterious effect on the vacuum field. As the plasma pressure is raised, the current in the resonant coils must also be raised. The final current in these coils is typically 1% of that in the stellarator primary coils.

The embodiments of this invention in which an exclusive property or privilege is claimed are defined as follows:

1. A method of maintaining three-dimensional MHD equilibrium of a plasma contained in a helical axis stellarator said stellarator having a set of primary coils, said method comprising the steps of:

providing a current through a resonant coil system about said stellarator, said resonant coil system having a configuration such that said current therethrough generates a magnetic field cancelling the resonant magnetic field, $B_1$, produced by currents driven by the plasma pressure at any given flux surface resonating with the rotational transform, $\chi$, of another flux surface in the plasma; and varying said current as a function of $\beta$, where $\beta = 2p_o/B_o2$, $p_o$ is the average plasma pressure, and $B_o$ is the average stellarator magnetic field produced by said primary coils.

2. The method of claim 1 wherein said current is varied such that $\beta$ satisfies the relationship:

$$\frac{B_1}{B_0} \simeq \beta\frac{L}{4\pi a^2}\delta_{nm}\left[\ln\frac{2-\rho_0}{\rho_0} + \sum_{j=1}^{2m+1}\frac{1}{j} + \frac{a}{\rho_0}\right]\sin(n\phi - m\theta)$$

at rational surface $\rho_o$ and where m is the number of period of said coil and n is the number of turns of said coil carrying current in the same direction, L is the length of the stellarator axis, a is the circularized plamsa radius, $\delta_{nm}$ are the Fourier amplitudes of the Jacobian of the stellarator magnetic field, and $\rho$, $\theta$, $\phi$ ar helical coordinates.

3. The method of claim 2 wherein m=3, n=2 and wherein said current is varied such that $\beta$ satisfies the relationship:

$$\frac{B_1}{B_0} \simeq \beta\frac{L}{4\pi\Delta\chi}\frac{\delta_{32}}{\rho}\left(\ln\frac{a}{\rho} + \frac{1}{4}\right)\sin(3\phi - 2\theta)$$

$\chi = n/m$ and $\Delta\chi$ is the change in $\chi$ across minor radius a.

4. In a helical axis stellarator having primary coils, an apparatus for maintaining three-dimensional MHD equilibrium in a plasma contained in said helical axis stellarator, said apparatus comprising:

a helical resonant coil system about said stellarator, said resonant coil system having a configuration such that current therethrough generates a magnetic field cancelling the resonant magnetic field, $B_1$, produced by currents driven by the plasma pressure on any given flux surface resonating with the rotational transform, x=n/m, of another flux surface in the plasma, where m is the number of periods of said helical resonant coil and n is the number of turns of said helical resonant coil carrying current in the same direction; and means for varying said current as a function of $\beta$, where $\beta = 2p_0/B_o{}^2$, $p_o$ is the average plasma pressure, and $B_o$ is the average magnetic field produced by the stellarator primary coils.

5. The apparatus of claim 4 wherein said means for varying said current is operable to vary the current such that $\beta$ satisfies the relationship $$\frac{B_1}{B_0} \simeq$$

$$\beta \frac{L}{4\pi a^2} \delta_{nm} \left[ \ln \frac{2 - \rho_0}{\rho_0} + \sum_{j=1}^{2m+1} \frac{1}{j} + \frac{2}{\rho_0} \right] \sin(n\phi - m\theta)$$

at rational surface $\rho_o$ with $\chi = n/m$ and where L is the length of the stellarator axis, a is the circularized plasma radius, $\delta_{nm}$ are the Fourier amplitudes o the Jacobian of the stellarator magnetic field, and $\rho$, $\theta$, $\phi$ are helical coordinates.

6. The apparatus of claim 5 wherein said stellarator has three periods and wherein said means for varying said current is operable to vary the current such that B satisfies the relationship $$\frac{B_1}{B_0} \simeq \frac{\beta L}{4\pi \Delta \chi} \frac{\delta_{32}}{\rho} \left( \ln \frac{a}{\rho} + \frac{1}{4} \right) \sin(3\phi - 2\theta)$$

where $\Delta\chi$ is the change in $\chi$ across minor radius a.

7. The apparatus of claim 6 wherein the magnitude of the current in said resonant helical coil is about 1% of the magnitude of the current in said stellarator primary coils.

* * * * *